Dec. 21, 1926.

D. M. REID

NUT LOCK

Filed Oct. 7, 1925

1,611,609

Inventor

D. M. Reid

By

Attorneys

Patented Dec. 21, 1926.

1,611,609

UNITED STATES PATENT OFFICE.

DAVID M. REID, OF HAMILTON, ONTARIO, CANADA.

NUT LOCK.

Application filed October 7, 1925. Serial No. 61,049.

This invention relates to a nut lock and specifically relates to that type in which a nut securing key is passed transversely through the portion of the threaded shank of a bolt which projects beyond the outer end of a nut screwed upon the bolt.

One object of the invention is to so form the key receiving passage of the bolt that the bolt will not be materially weakened and to further so form this key receiving slot or passage that the securing nut may be readily screwed upon the bolt and also easily removed when the securing key is withdrawn.

Another object of the invention is to so form the key that it may be tightly wedged in the key receiving slot of the bolt and after being inserted have one end portion twisted to prevent it from being jarred out of place.

Another object of the invention is to provide a nut lock of such construction that a bolt and cooperating nut of an ordinary formation may be employed when forming the same.

This invention is illustrated in the accompanying drawing, wherein

Figure 4:
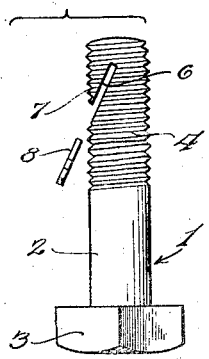
Fig. 4 is a view in side elevation of the bolt with the nut removed.

The bolt 1 is of a conventional construction and includes a shank 2 formed with a head 3 at one end and having its free end portion threaded, as shown at 4, in order to receive the nut 5 which is also of a conventional construction. It should be noted, however, that the threaded end portion 4 of the shank 2 has been formed with a slit 6 which extends longitudinally of the shank but is disposed at an incline and terminates in spaced relation to the free end of the shank, as clearly shown in Fig. 4. By having the slit 6 cut at an incline and terminating in spaced relation to the free end of the shank, the bolt is not materially weakened and in addition the nut can be very readily screwed upon the bolt or removed from it. If the portion 7 of the bolt tends to spring outwardly, the nut as it is screwed upon the bolt will force this portion back into its proper position and as the nut is ordinarily not screwed upon the bolt beyond the free end of the portion 7, it may be readily unscrewed when so desired.

Figure 1:
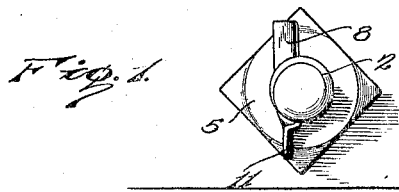
Figure 1 is a view in end elevation showing a nut locked upon a bolt.
Figure 2:
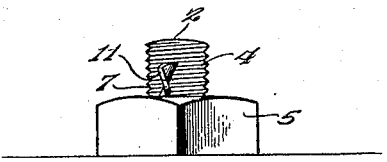
Fig. 2 is a view illustrating the improved nut lock in side elevation.
Figure 3:
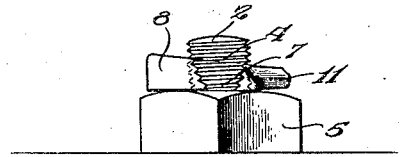
Fig. 3 is a view in side elevation taken at right angles to the view in Fig. 2.
Figure 6:
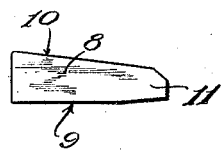
Fig. 6 is a side elevation partially in section showing the lip of the bolt shank disposed for engagement with the outer face of the nut.
Figure 5:
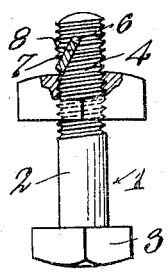
Fig. 5 is a view illustrating the key in side elevation before it is inserted.

After the nut has been tightened upon the bolt, the key 8 is passed through the slit 6 transversely of the bolt. This key is formed of pliant sheet metal but is of sufficient stiffness to prevent it from being bent or twisted without the aid of a pair of pliers. It will, therefore, be seen that a person cannot bend the key with his fingers and, therefore, an unauthorized person is not liable to remove the key. This key is formed as shown in Fig. 5 and tapers toward one end, thereby providing an edge 9 for flat contacting engagement with the outer end face of the nut and an inclined edge 10 which engages the closed end of the slit and causes the key to be tightly wedged in place when driven through the slit. After the key has been driven through the slit in the bolt, its smaller end portion 11 is gripped with a pair of pliers or the like and this end portion twisted, as shown in Figs. 1 and 2, so that it extends in crossed relation to the slit and prevents the key from being jarred loose by vibration. Since the key is tightly wedged between the outer end face of the nut and closed end of the slit when in place, the nut will be securely held and cannot work loose upon the bolt. When, however, it is desired to remove the nut, the twisted end portion 11 of the key may be readily turned to its original position by means of a pair of pliers and the key removed thereby releasing the nut and permitting of its being unscrewed from the bolt. If the nut has been screwed upon the bolt beyond the free end of the portion 7 thereof, as shown in Fig. 6, and this portion become sprung so that it interferes with unscrewing of the nut, a second nut can be temporarily screwed upon the extended end portion of the bolt to force the portion 7 back to its proper position so that the nut 5 may be unscrewed.

Having thus described the invention, I claim:

1. In a nut lock construction, a bolt having a threaded shank formed with a slit extending inwardly and forwardly from a side of the shank and terminating in spaced relation to the free forward end of said shank, a nut screwed upon said shank an extent to project the closed forward end portion of the slit beyond the outer end of the nut, and a tapered key formed of sheet metal passed transversely of the nut through said slit with its end portions projecting from the bolt shank and engaging the outer end face of the nut at opposite sides of the bolt, said key being disposed diagonally of the axis of the bolt and when forced through the slit adapted to move the portion of the shank forming the outer side wall of the slit into overlapping engagement with the outer face of a nut screwed upon the shank beyond the free end of the said side portion thereof.

2. A bolt having a threaded shank and a head at one end of said shank, said shank being formed with a longitudinally extending diagonally disposed slit opening through one side of the bolt and providing the bolt with a lip portion integral at its outer end with the body of the bolt and having its free end facing the head of the bolt in spaced relation thereto, and a locking key adapted to be passed through said slit and wedged therein between the closed outer end of the slit and the outer face of a nut to be screwed upon the shank with the end portions of the key extending from the bolt in overlapped relation to the outer face of the nut.

In testimony whereof I affix my signature

DAVID M. REID. [L. S.]